(12) United States Patent
Park

(10) Patent No.: US 7,868,057 B2
(45) Date of Patent: Jan. 11, 2011

(54) VEGETATION BASIS AND METHOD OF PRODUCTION THEREOF

(76) Inventor: Kongyoung Park, 696 Songkog-ri, Moga-myeon, Icheon-shi, Kyeonggi-do (KR)

( * ) Notice: Subject to any disclaimer, the term of this patent is extended or adjusted under 35 U.S.C. 154(b) by 0 days.

(21) Appl. No.: 12/283,203

(22) Filed: Sep. 10, 2008

(65) Prior Publication Data

US 2009/0076190 A1   Mar. 19, 2009

(30) Foreign Application Priority Data

Sep. 14, 2007   (KR) .................... 10-2007-0093655

(51) Int. Cl.
*A01G 9/02* (2006.01)
*C08K 3/34* (2006.01)
*C08K 11/00* (2006.01)

(52) U.S. Cl. ..................... 523/123; 524/442

(58) Field of Classification Search ............... 523/123; 524/442
See application file for complete search history.

(56) References Cited

U.S. PATENT DOCUMENTS

| | | | | |
|---|---|---|---|---|
| 3,056,757 A | * | 10/1962 | Rakowitz | 523/130 |
| 3,834,072 A | * | 9/1974 | Rack | 47/74 |
| 3,844,987 A | * | 10/1974 | Clendinning et al. | 47/74 |
| 3,921,333 A | * | 11/1975 | Clendinning et al. | 47/74 |
| 3,971,223 A | * | 7/1976 | Barrett | 405/264 |
| 4,004,368 A | * | 1/1977 | Tully | 47/58.1 R |
| 4,045,204 A | * | 8/1977 | Matsunaga et al. | 71/11 |
| 4,447,380 A | * | 5/1984 | Shannon et al. | 264/82 |
| 4,495,310 A | * | 1/1985 | Dedolph | 521/99 |
| 4,790,691 A | * | 12/1988 | Freed | 405/263 |
| 4,882,112 A | * | 11/1989 | Maki et al. | 264/109 |
| 4,936,711 A | * | 6/1990 | Sasahara | 405/263 |
| 5,200,261 A | * | 4/1993 | Taguchi et al. | 442/200 |
| 5,588,783 A | * | 12/1996 | Brabston et al. | 405/302.6 |
| 5,660,900 A | * | 8/1997 | Andersen et al. | 428/35.6 |
| 5,746,546 A | * | 5/1998 | Hubbs et al. | 405/263 |
| 5,753,330 A | * | 5/1998 | Terakawa et al. | 428/36.3 |
| 5,759,225 A | * | 6/1998 | Tanoshima | 71/24 |
| 6,029,395 A | * | 2/2000 | Morgan | 47/9 |
| 6,032,410 A | * | 3/2000 | Kumar | 47/56 |

(Continued)

FOREIGN PATENT DOCUMENTS

JP   1990-145133 A   6/1990

(Continued)

*Primary Examiner*—Mark Eashoo
*Assistant Examiner*—Liam J Heincer
(74) *Attorney, Agent, or Firm*—Todd E. Garabedian; Wiggin and Dana LLP

(57) ABSTRACT

The present invention relates to a vegetation basis, which can be molded at low pressure and temperature and further, keep the crumbled structure suitable for plant growth either by means of a viscosity of a sheath-core type fiber or by addition of a hot melt adhesive, as the powder-typed eco-friendly adhesive, and a fibrous material to the artificial soil, instead of using the liquid-type adhesive, and further can readily absorb and retain water even in case the basis is dried after molding, by additionally incorporating bentonite or water absorbant polymer, if necessary, and to a process for production thereof. In addition, the present invention provides an eco-friendly vegetation basis, which can be decomposed within a short period of time after rooting the plants, and a process for production thereof.

5 Claims, 4 Drawing Sheets

U.S. PATENT DOCUMENTS

| | | | | |
|---|---|---|---|---|
| 6,042,305 | A * | 3/2000 | Novich et al. | 405/266 |
| 6,290,769 | B1 * | 9/2001 | Carkner | 106/675 |
| 6,293,045 | B1 * | 9/2001 | Morgan | 47/9 |
| 6,397,520 | B1 * | 6/2002 | Kosinski | 47/64 |
| 6,444,730 | B1 * | 9/2002 | Brueggemann et al. | 524/35 |
| 6,555,219 | B2 * | 4/2003 | Kosinski | 428/357 |
| 6,615,539 | B1 * | 9/2003 | Obonai et al. | 47/62 N |
| 6,829,860 | B1 * | 12/2004 | Lee et al. | 47/9 |
| 7,059,083 | B2 * | 6/2006 | Abitz et al. | 47/56 |
| 2002/0132960 | A1 * | 9/2002 | Haile et al. | 528/272 |
| 2003/0134556 | A1 * | 7/2003 | Christie et al. | 442/327 |
| 2003/0140556 | A1 * | 7/2003 | Frogley | 47/63 |
| 2003/0203131 | A1 * | 10/2003 | Lemay | 428/15 |
| 2004/0091326 | A1 * | 5/2004 | Spittle | 405/302.7 |
| 2005/0178056 | A1 * | 8/2005 | Morrone | 47/9 |
| 2005/0246950 | A1 * | 11/2005 | Girard et al. | 47/9 |
| 2006/0070294 | A1 * | 4/2006 | Spittle | 47/9 |
| 2006/0070295 | A1 * | 4/2006 | Huang et al. | 47/9 |
| 2006/0150494 | A1 * | 7/2006 | Masson | 47/59 S |
| 2006/0168885 | A1 * | 8/2006 | Kimoto et al. | 47/77 |
| 2007/0289543 | A1 * | 12/2007 | Petska et al. | 119/173 |
| 2008/0241539 | A1 * | 10/2008 | Sugiyama et al. | 428/401 |
| 2009/0019765 | A1 * | 1/2009 | Kosinski et al. | 47/64 |
| 2009/0151602 | A1 * | 6/2009 | Francis | 106/675 |
| 2009/0165934 | A1 * | 7/2009 | Koike | 156/182 |

FOREIGN PATENT DOCUMENTS

| | | | |
|---|---|---|---|
| JP | 1995-50924 A | | 2/1995 |
| JP | 1995-155076 A | | 6/1995 |
| JP | 2005232405 A | * | 9/2005 |
| KR | 10-0631380 B | | 9/2006 |
| WO | WO 2004/098270 | | 11/2004 |
| WO | WO 2007/011225 | | 1/2007 |

* cited by examiner

VEGETATION BASIS AND METHOD OF PRODUCTION THEREOF

BACKGROUND OF THE INVENTION

1. Technical Field

The present invention relates to a vegetation basis either prepared by mixing a sheath-core type polyester staple fiber with an artificial soil or comprised of a fibrous material, a hot melt adhesive and the balance of bed soil, and a process for production thereof. More specifically, the present invention relates to a vegetation basis which can provide the condition suitable for plant growth by mixing the general commercial, artificial soil with a fibrous material and a hot melt adhesive to form a sponge type netted construct having the crumbled structure, thereby giving the bonding strength to the artificial soil, while has a light weight and further, either has a semi-permanent durability or is degradable within a short period of time, if desired, and to a process for production thereof.

2. Brief Description of the Background Art

The vegetation basis denotes the bases made from artificial soil capable of allowing the plant to germinate, root and grow.

In general, in order to allow the plant to grow such areas as rooftop, vertical wall of buildings, concrete block, bank protection block, concrete slope of tide embankment, etc. there is a need of the artificial ground and construct. Therefore, for eliminating any inconvenience due to addition of the artificial soil and separate complicated and difficult constructs in such areas, and reducing the construction costs the vegetation bases have been used. In addition, the vegetation bases have been widely used to form the vegetation base for preventing the leaching of earth and sand from slopes resulting from the road construction to cut mountains or the river conservation work, by a simple construction work within a short period of time. Furthermore, as recently a shortage of the green zone due to urbanization and the effects of plant, including air cleaning, soundproofing, insulation, etc., have been noted, the attempt to green the vertical exterior walls of buildings or in the soundproofing walls around the road, the bridge piers, the retaining walls of the road, the median strips, etc., with various plants by means of the vegetation mat has been made instead of the simple greening with climbing plants in the prior art.

The most widely used vegetation basis is the vegetation mat. The vegetation mat is manufactured generally by compression molding of the artificial soil into the checkerboard pattern. The artificial soil has been generally used for greening the artificial ground such as rooftops, and in order to facilitate the work with the artificial soil the vegetation mat has been used. When the space such as rooftops is greened using the vegetation mat, due to the insulating effect of plants the energy required for the heating and cooling of buildings can be reduced, the urban heat island to more increase the atmospheric temperature over the city as compared to that in the suburbs can be prevented, and further it is possible to provide the air cleaning effect and the psychological wellbeing to persons.

The major aspects to be considered in the vegetation mat include first the easy handling through maintaining the mechanical shape of the mat or basis at a minimum, and secondly, the permeability, absorbability, drainage and nutrient adsorbability suitable for plant growth, and next, the weight and durability.

The properties for the bed soil as the basic raw material of the vegetation mat should provide with the following requisites, i.e. (1) appropriate water holding capacity and fertilizer holding capacity, (2) optimum permeability to help root respiration, (3) not containing any bacteria, worms and seeds, (4) maintenance of the acidity in the range of weak acidity to neutrality, (5) uniform physico-chemical properties, (6) suitable and uniform particle size of the bed soil, (7) easy handling property, and (8) superiority of block formation (root tangibility).

The artificial soil used for the vegetation mat can be generally classified into the bed soil as the artificial soil required for seedling, and the culture soil as the artificial soil required for plant growth. The bed soil used as the artificial soil has been commercially available from many companies, and typically comprises cocopeat (coir), peat moss, vermiculite, zeolite, perlite, water-soluble fertilizer and antibacterial substances and wetting agents although their compositional ratios may be different from each other.

In the prior art, the vegetation basis has been manufactured in the manner either that the adhesive is added to the artificial soil followed by compression molding or that the artificial soil is wrapped with the natural fiber (e.g. coir). Coir is the cellulose collected from fruits of coconut palm, and has not so much high strength and is relatively elastic and light, and particularly does not well rot in sea water but has the limitation in use as the natural fiber with respect to the strength or weathering resistance.

As the major material for the artificial soil, perlite is extensively used because it has a low density and a low unit cost. Urea resin is generally used as the adhesives. However, the components of the adhesive comprise phenol and formaldehyde, which cause the problem that they may have a bad influence on the growth of plant. Further, when the artificial soil is solidified with using such liquid type adhesives as urea resin, the molding step must perform with using a high pressure, which brings the condition that pores present in the soil disappear. The pores mean the gap between soil particles as one of the physical properties of the soil. As the particle size is larger and uniform, many gaps between particles are present to grow the pores. Since the pores play a role of retaining air and water, it may be said a good soil is the soil in which water absorption and air ventilation are well achieved. Thus, if the pores are reduced, there is the problem that it may have a bad influence on the plant growth.

Depending on the used place and function of the vegetation mat, one of the important factors is the durability. Up to the present, many vegetation mats for greening the vertical wall have been manufactured with the natural fiber and the bed soil. However, upon passing one or more year after manufacturing and disposing the mat there was the problem that the vegetation mat loses its original function because of rottenness itself to reduce the mat to the half and to flow down.

The typical planting methods for the vegetation basis in the prior art are those for mixing, or applying to the surface, the seeds and, in case of the seedlings, for cutting the basis and then digging the contents away and planting the seedlings. Therefore, there was the problem that when the vegetation basis is intended to vertically stand, the contents are more readily discharged through such grating holes to more shorten the durability of said basis.

In order to solve such problems, various alternatives have been suggested. For example, Korean Registered Patent No. 10-0500963 discloses the sedum vegetative mat comprised of a natural fiber net on the back side, an artificial soil layer laid on the surface layer thereof, a sedum trophosome scattered and compressed on the artificial soil layer, and a natural fiber net attached on the surface side of the artificial soil layer; and Korean Registered Patent No. 10-0537293 discloses the vegetation mat manufactured by addition of 40 to 50% by weight of coconut chip, 40 to 50% by weight of coco dust, 1 to 10% by weight of peat moss, 1 to 10% by weight of decomposed bark, natural fertilizer, inorganic-based trace element additives to a coir cloth manufactured utilizing a coir as the fiber collected from fruits of coconut palm, followed by compression molding.

However, said inventions emphasized on the eco-friendly elements to use the natural fiber, wrap the outside of the mat with the net of such natural fiber and then mold the artificial soil under compression. Therefore, since in said methods the artificial soil itself has no adhesive property, there is the problem that the pressure applied for molding a shape of the vegetation mat cause brings about reduction of the pores present in the artificial soil and thus, is not desirable to the plant growth. Further, upon passing one or more year after disposing the vegetation basis on the vertical wall there was also the problem that said basis rots and flows down to so that the original purpose of said basis cannot be attained.

In case of the vegetation mat wrapped with the natural fiber on the outside thereof, it has no difference in the reduction of weight as compared to the light soil used to form the vegetation space, and when the mat is exposed to a sun light or a dramatic change of temperature, the natural fiber net used for preventing the discharge of the artificial soil from the inside of the mat has a low durability due to the limit of natural fibers so that the artificial soil present in the mat may be discharged not long after disposing the mat to make the attainment of the original purpose of the mat difficult and to cause a necessity of the complicated reconstruction. Further, there is also the problem that since the plants are planted after the vegetation holes are cut into the grating form, the contents are more readily discharged from such holes. Such problems are more remarkable particularly when the mat is disposed on the sharply sloped place or on the vertical wall or soundproofing wall. In addition, wrapping the outside of the vegetation mat with the net makes the manufacturing procedures more complicated to ultimately result in an increase of the production unit cost, and use of the coir for the outer net may cause a possibility of inhibiting the absorption of water and nutrients by plants due to the oil fraction membrane of coir.

Further, Korean Registered Patent No. 10-0750564 discloses the vegetation mat which has a rigid grid having the grating net structure and in which the vegetation bed is bonded with the eco-friendly adhesive comprised of 70 to 80% by weight of carboxy methylcellulose, 2 to 15% by weight of the germinating and rooting promoter, and water constituting the balance. However, even though the adhesive is eco-friendly, at least an amount of the adhesive should be used so as to have a minimum bonding strength, and therefore, the components of the adhesive may impede the formation of pores within the vegetation mat, and further, use of such separate construct as the rigid grid, in addition to the vegetation mat, may cause the problem of an increase in the manufacturing unit cost.

In order to maintain the vertical wall for a long period, the non-rotting fibers or frameworks are needed. On the contrary, to cover the construct having a gentle slope such as bank protections or ponds the basis which is readily and rapidly decomposed is needed, since the basis is eco-friendly when the vegetation basis is rotted and decomposed after the plants take root and then the root block is completely established.

SUMMARY OF THE INVENTION

The present invention is contrived in order to solve the above-mentioned problems. The object of the present invention is to provide a vegetation basis manufactured by mixing an artificial soil with a fiber having the adhesive strength.

Another object of the present invention is to provide a vegetation basis having pores suitable to the plant growth, which is allowed to have a sufficient bonding strength to the artificial soil by mixing the artificial soil with a fibrous material and a hot melt adhesive as the eco-friendly powder adhesive rather than the liquid adhesive, and can also be molded even under a low pressure at a low temperature.

Another object of the present invention is to provide a sponge-type vegetation basis, which has a crumbled structure while also providing the vegetation basis, by utilizing a semi-permanently, non-rotting fiber. Here, the crumbled structure means the soil-forming structures formed by gathering grains together to form crumbs, which are then gathered, and having more gaps, as compared to the grain structure, so as to well pass water and air, and further allowing the roots of plants to easily extend.

Another object of the present invention is to provide an eco-friendly vegetation basis which utilizes the biodegradable fiber so that it can be readily decomposed within a short period of time after the plants take root.

Another object of the present invention is to provide a vegetation basis wherein the artificial soil can readily absorb water after drying while also having a sufficient strength.

Another object of the present invention is to provide a process for production of said vegetation basis.

ILLUSTRATION OF SYMBOLS USED IN THE FIGURES

Figure 1:
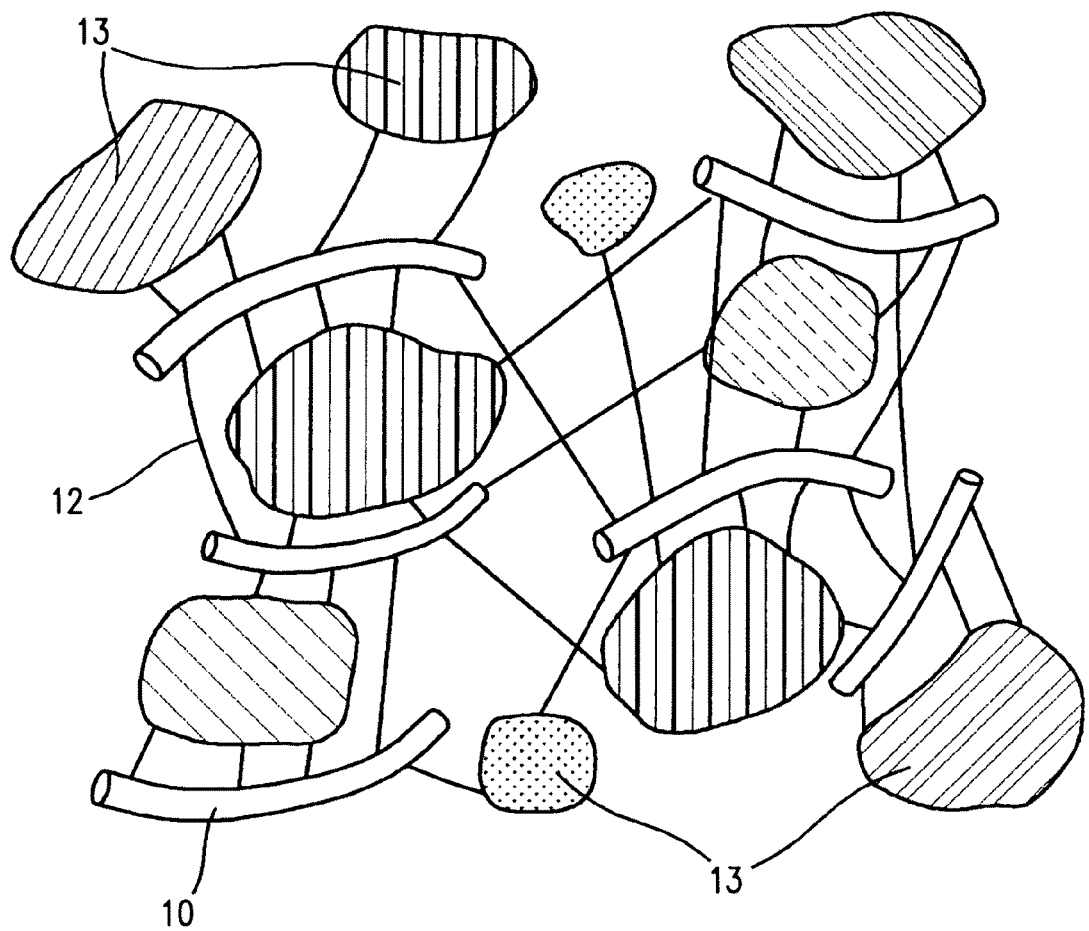
FIG. 1 is an enlarged diagram showing the sponge-type network structure between the polyester staple fiber and particles of the artificial soil as formed in the present invention.

10 . . . Polyester staple fiber
12 . . . Structure formed by melting the low-melting polyester staple fiber
13 . . . Particles of the artificial soil
21 . . . Fibrous material
22-24 . . . Materials constituting the artificial soil
25 . . . Hot melt adhesive
26 . . . Bentonite or water absorbant polymer.

DETAILED DESCRIPTION OF THE INVENTION

Means to Solve the Subject Matter

In order to attain the object of the present invention, the vegetation basis formed by mixing a sheath-core type of the polyester staple fiber, which provides in itself with the adhesive strength to the artificial soil, with the artificial soil is provided.

In order to attain another object of the present invention, the vegetation basis comprised of the fibrous material, the hot melt adhesive and the artificial soil is provided.

In the present invention, by constructing the vegetation basis which is capable of molding under a low pressure at a low temperature while overcoming the defects to disappear the pores of the artificial soil when the liquid adhesives including urea resin serve as the binder, in order to maintain the crumbled structure effective for the plant growth the eco-friendly, fine powder type of the hot melt adhesive, which provides the bonding strength through melting with heat and then cooling down, together with the fibrous material is used to provide with the bonding strength to the artificial soil.

As the fibrous material, general polyester staple fibers, sheath-core type polyester staple fibers or sheath-core type OEP (olefin polyethylene polypropylene—the inside is comprised of the polypropylene fiber having melting point of about 165° C. and the outside is comprised of the low-melting polyethylene fiber) staple fibers can be used in order to manufacture the semi-permanent vegetation basis. In addition, to provide the vegetation basis which can decomposed within a short period of time after taking the roots of plants so as to be suitable to use on the gentle slope such as bank protections or ponds, a biodegradable fiber can be used as the fibrous material. The biodegradable fibers suitable for the present invention include corn starch fibers or sheath-core type corn starch fibers.

Further, bentonite or water absorbant polymer can be additionally included so that the vegetation basis as manufactured can readily absorb water after drying.

The process for manufacturing the vegetation basis according to the present invention comprises the step of preparing the artificial soil and the fibrous material; the step of mixing said components; the step of loading the resulting mixture of said components into the mold; the step of molding said loaded mixture with heating; and the step of drying the molded mixture. If appropriate, in case where the vegetation basis comprising the hot met adhesive, bentonite or water absorbant polymer is desired to be manufactured, such materials are mixed with said materials.

Effect

Since the vegetation basis manufactured by the present invention provides a high bonding strength by the sponge-type network structure formed upon melting the low-melting polyester staple rather than by the adhesive, it has no problem such as inhibition of the plant growth with components of the adhesive, and improves the defects in the prior vegetation bases not to absorb water, with maintaining the pores in the artificial soil as they are. Further, the present invention can provide the high strength vegetative basis capable of absorbing water upon short raining and watering in the nature, by means of the strong water absorption property of bentonite or water absorbant polymer, while maintaining the supply of nutrients sufficient for the growth of plants and the physicochemical properties of the basis. Furthermore, in the present invention it is provided the vegetation basis which has no problem such as inhibition of the plant growth by mixing the artificial fiber as not being readily rotted, can be processed into various shapes only with heat or drying even without using any additional construct such as nets so that it can keep its shape even in case where the basis is vertically constructed, and is semi-permanent due to a rigid property of the artificial fiber. In addition, when the biodegradable fiber is used instead of the artificial fiber, the vegetation basis can be decomposed within a short period of time after rooting the plants to enjoy the eco-friendly effect.

Specific Matters for Carrying Out the Invention

In order to attain the object of the present invention, either the vegetation basis comprising 100 parts by weight of the artificial soil and 4 to 30 parts by weight of the sheath-core type polyester staple fiber having the melting point of 70 to 150° C. of the sheath component and of at least 270° C. of the core component (hereinafter, referred to as 'the sheath-core type polyester staple fiber') and/or the vegetation basis comprising 0.2 to 8 parts by weight of the hot melt adhesive is/are provided.

In order to attain the other object of the present invention, the vegetation basis comprising 0.1 to 5 parts by volume of the fibrous material, 0.1 to 5 parts by volume of the hot melt adhesive and the artificial soil as the balance is provided.

In order to attain another object of the present invention, the vegetation basis comprising 0.1 to 5 parts by volume of the fibrous material, 0.1 to 5 parts by volume of the hot melt adhesive, 0.5 to 10 parts by volume of bentonite and the bed soil as the balance is provided.

In order to attain another object of the present invention, the vegetation basis comprising 0.1 to 5 parts by volume of the fibrous material, 0.1 to 5 parts by volume of the hot melt adhesive, 0.5 to 10 parts by volume of water absorbant polymer and the bed soil as the balance is provided.

Said fibrous material can be selected from polyester staple fibers, sheath-core type polyester staple fibers, OEP (fibers having melting point of about 140-145° C. of the sheath part comprised of low-melting polyethylene and melting point of 160-165° C. of the core part comprised of polypropylene, for the use as hygienic materials including diaper, sanitary napkin, etc., and as non-woven fabrics for other various purposes), corn starch fibers and sheath-core type corn starch fibers.

In the present invention, by constructing the vegetation basis which is capable of molding under a low pressure at a low temperature while overcoming the defects to disappear the pores of the artificial soil when general liquid adhesives is used as the binder between particles of the artificial soil, in order to maintain the crumbled structure effective for the plant growth either the sheath-core type polyester staple fiber or the hot melt adhesive, which provides the bonding strength through melting with heat and then cooling down, together with the fibrous material is used to provide with the bonding strength to the artificial soil. The crumbled structure of the artificial soil included in the vegetation basis manufactured according to the present invention is shown in FIG. 1.

The polyester fiber is the generic name of fibers prepared from polymeric compounds having ester groups in the molecule as the raw material. The polyester fiber has various merits including high strength, especially good knot strength and abrasion strength, no crumpling, rapid drying, no invasion with chemicals or bugs, etc. Other characteristic features include a high resistance to the heat. In general, synthetic fibers are weak to the heat but, inter alia, polyesters are most resistant to heat with having the melting point of about 270° C. For polyester fibers, many attempts have been made in order to change the properties and effects thereof for the purpose of improvement or reformation. One of them is the low-melting polyester (LMP) fiber. The low-melting polyester fiber is the polyester which has the melting point of 70 to 150° C., and thus can be melted at low temperature and bonded without using any adhesive.

The present invention uses the sheath-core type polyester staple fiber instead of the liquid adhesives, wherein the low-melting polyester staple fiber forming the sheath component is melted while providing the direct bonding strength between particles of the artificial soil as well as connecting between the polyester fibers to form the network structure. That is, when the sheath-core type polyester staple fiber is mixed with the artificial soil and then heated to the temperature higher than the melting point of the sheath component but lower than the melting point of the core component, for example, 70 to 250° C., only the sheath component is melted to form the network structure while the core component remains with not melting so as to provide the framework of the network structure, which plays a role in increasing the bonding strength to the vegetation basis as well as in providing the structure capable of firmly fixing the root as the plants grow. The network structure formed as the sheath component is melted provides with the bonding strength to the vegetation basis even without using any liquid adhesive so that the shape of the vegetation basis can be supported even without using any additional structure such as for wrapping the outside with the net, and therefore, it is possible to maintain the shape even in case where the basis is vertically positioned on such areas as sharp slops, vertical walls of buildings or soundproofing walls. Further, the shape maintenance of the basis can be semi-permanently continued due to the strength and weatherability of polyester fibers.

The present invention provides the vegetation basis formed by mixing 100 parts by weight of the artificial soil with 4 to 30 parts by weight of the sheath-core type polyester staple fiber. If the sheath-core type polyester staple fiber is mixed in an amount less than 4 parts by weight, a sufficient bonding strength is not provided to the vegetation basis, whereas if the amount of said fiber is in excess of 30 parts by weight, the polyester fiber may be tangled with each other and the bonding strength is too strong and a ratio of the artificial soil is lowered so that the basis may not be desirable to the growth of plants.

The sheath-core type polyester staple fiber of the present invention is present in the twisted state of respective strands, and is mixed by means of various mixers utilizing the rotation of 500 rpm or more but of 6,000 rpm or less, as known to a person skilled in the art. If the rotation is less than 500 rpm, the mixing of the staple fiber with the artificial soil is not well accomplished, whereas if the rotation is in excess of 6,000 rpm, the rotation is too strong so that the polyester staple fibers may be tangled together, the artificial soil may be physically deformed into too small grain thereby making the soil pores inferior. After mixing the artificial soil with the sheath-core type polyester staple fiber, the sponge-type network structure is formed by heating the resulting mixture to melt the low-melting polyester staple fiber. The heating temperature is preferably in the range of 70 to 250°. If the heating temperature is lower than 70° C., the low-melting polyester staple fiber cannot be melted, whereas if the heating temperature is higher than 250° C., even the polyester staple fiber as the core component may be melted as well as the low-melting polyester fiber.

Meanwhile, according to the study conducted by the present inventors it could be observed that when the vegetation mat is manufactured using only the sheath-core type staple fiber, there is the problem that the bonding strength may not be sufficient and thus, the case where the basis is easily broken may be caused. When the mixing ratio of the fiber is raised to 30 parts by weight or more for enhancing the bonding strength, the bonding strength is enhanced but moisture is readily dried and the basis is not desirable to the sight of view due to so much fiber mass, and a bad influence on the plant growth may be caused. Thus, it has been found that as the agent playing a role of the adhesive to complement the above-mentioned problems the powder-type hot melt adhesive which provides the bonding strength with melting at temperature of about 70° C. to 200° C. can be additionally included in an amount of 0.2 to 8 parts by weight to enhance the bonding strength of the vegetation mat thus manufactured and further to overcome such problems.

The hot melt adhesive is a pollution-free, hot melting adhesive, which does not use any of water and solvents; is formed by mixing the main three components, i.e. the base polymer, a thermoplastic resin (20-50%), and a tackifier (30-50%) and waxes (10-30%) to decrease the viscosity and improve the applicability upon melting, with an antioxidant and a filler; and when applying and adhering it to the surface of the adherend in the melted state with heating, is solidified to display the adhesion. It is the adhesive used for the automatic package in producing beverage, confectionery, instant noodle, pharmaceuticals and other necessaries of life, and has a softening point (melting point) of about 70° C. to 200° C. Such hot melt adhesive has been disclosed in Korean Registered Patent No. 10-0815142, etc. The hot melt adhesive includes thermoplastic polyurethane elastic resins (TPU) having all the properties of rubber and plastics, epoxy resins as the thermoplastic resin produced by polymerization of epoxy group, polyester resins belonging to the thermoplastic resin, and polyethylene resins as most extensively diffused in the world. The low-melting polyester fiber can be softened at temperature of 70-150° C., and therefore, can be used as the hot melt adhesive. Although any of such various kinds of hot melt adhesives can be used in the present invention, the polyurethane resins can be more widely used in constructing with the vegetation basis and therefore, are more advantageous in relation to the product according to the present invention, since they are an elastomer having good flexibility.

Although the hot melt adhesive takes various forms including bar, plate, etc., the present invention uses the adhesive in the form of a fine powder. Use of the hot melt adhesive in the form of a fine powder can provide the advantages that the removal of pores present in the artificial soil as caused by using the existing adhesives, i.e. liquid type adhesives can be prevented, and the hot melt adhesive can be uniformly blended in the manufacturing procedures. Use of the hot melt adhesive, instead of the liquid type adhesives, can also enjoy the additional effect that the production of volatile substances including formaldehyde, as generated in using the liquid type adhesives, can be prevented to make the working environment advantageous.

When used together with the sheath-core type polyester staple fiber, the hot melt adhesive is included in an amount of 0.2 to 8 parts by weight. If the amount is less than 0.2 parts by weight, the problems that the working efficiency is lowered and the artificial soil readily leaves from the basis may be caused, since the solidarity becomes not enough. On the contrary, if the amount is greater than 8 parts by weight, the solidarity is too much strong and the elasticity is lowered, and further, it looks like a white powder to damage a good appearance.

Use of the sheath-core type polyester staple fiber results in providing the direct bonding strength between particles of the artificial soil which give, together with the adhesive strength of the hot melt adhesive used in the present invention, a stronger bonding strength between particles of the artificial soil. In addition, upon melting the low-melting polyester fiber interconnects between polyester fibers to form the sponge-type network structure. When the sheath-core type polyester staple fiber is mixed with the artificial soil and then heated at temperature greater than the melting point of the sheath component but less than the melting point of the core component, only the low-melting polyester fiber is melted to form the network structure while the polyester fiber of the core component is maintained without melting to provide the framework of the network structure, which plays a role in increasing the bonding strength to the vegetation basis as well as in providing the structure capable of firmly fixing the root as the plants grow.

In the present invention, it could be found that the hot melt adhesive can also be used together with general polyester staple fibers, biodegradable fibers or OEP, as well as said sheath-core type polyester staple fiber. If said fibrous materials are sued together with the powder-type hot melt adhesive, the hot melt adhesive is melted with a high heat to provide the direct bonding strength between particles of the artificial soil and further to interconnect between fibrous materials resulting in formation of the sponge-type network structure.

When used together with other fibrous materials than the sheath-core type polyester staple fiber, the hot melt adhesive is included in an amount of 0.1 to 5 parts by volume. If the amount is less than 0.1 parts by volume, the disadvantages that the working efficiency is lowered, the vegetation basis may be broken or crushed, and of course, the artificial soil readily leaves from the basis may be caused, since the solidarity becomes very weak. On the contrary, if the amount is greater than 5 parts by volume, the solidarity is too much strong and the elasticity is lowered, and further, it looks like a white powder to damage a good appearance.

The biodegradable fiber used in the present invention denotes a natural fiber, particularly corn starch fibers or sheath-core type corn starch fibers. In case where such biodegradable fiber is used on the bank protections or the construct having a gentle slope such as ponds or reservoir the vegetation basis has the advantage that since it is decomposed after rooting the plants, no environmental pollution is caused. In using general natural fibers including celluloses, for example, coir in the present invention, since they are gone with burning during the manufacturing procedures according to the present invention, for example, corn starch fibers which does not burn at 150° C. is suitable to the present invention.

General plastics widely used in the modern society require at least hundreds of years for decomposition or, in general, are substantially not decomposed, under the natural environment, and therefore, are detrimental to the appearance. Further, since various kinds of waste vinyl bags, packaging papers, styrofoams, etc are not properly disposed, they are regarded as being the major cause to pollute the environment. Therefore, the new material which can be readily decomposed under the conditions of the natural environment to cause no problem of environmental pollution is highly required. According to such requirement, 'the biodegradable plastics' or 'the biodegradable fibers' have been proposed.

The biodegradable fibers are decomposed by the process which comprises first decomposing the plastic chains into the low molecular compounds with hydrolytic enzymes externally secreted from microbes, followed by absorption of the decomposed products into the body of microbes and the metabolism into various biomolecules, carbon dioxide and water. The decomposition of the biodegradable macromolecules occurs through hydrolysis, oxygen, or hydrolysis of ester linkage with such enzymes as lipase. The degradation rate is greatly varied depending on the structure and morphology of macromolecules, the reproduction conditions of microbes, the oxygen activity, etc. The biodegradable macromolecules which can be completely degraded include polycarprolactone (PCL), poly(hydroxyalkanate) (PHA), poly (lactic acid) (PLA), poly(hydroxy butyrate valerate) (PHBV), poly(butylene succinate) (PBA), and other aliphatic polyesters and natural macromolecules.

Of such biodegradable plastics, PLA (poly lactic acid) is a polymer of the low molecular compound (monomer), called lactic acid, present in the living organisms, and has been known that it is converted into the low molecular compound by hydrolysis with water and then, decomposed with microbes. Poly lactic acid fibers are prepared according to the process which comprises fermenting corn starch to produce lactic acid via glucose and then condensing lactic acid to prepare PLA, which is then subjected to melt spinning or melt molding procedure together with polyesters or nylons. Corn is composed of starch, gluten, husk, hull and fiber, and germ, with starch accounting for 65%, which is converted into lactic acid through fermentation. In this case, the optical isomer in which L-form of lactic acid constitutes the main part and D-form is also present is produced. Cargill Inc. in USA has developed the raw material of PLA (NatureWorks PLA) and supplied under the trademark "Ingeo". Also, three to four Japanese companies and Novament of Intaly have also developed and practically implemented PLA materials. It has been known that PLA has the molecular structure of H—(OCH$(CH_3)$CO)n-OH and the melting point of about 175° C. Therefore, it dose not burn at high temperature of the process for manufacturing the vegetation basis of the present invention and remains in the artificial soil to keep the framework of the basis. Although general corn starch fibers can also be used, the sheath-core type corn starch fibers were also marketed and therefore, such commercialized product can be purchased and used. They can be prepared so that the sheath component has a low-melting point (e.g. 130-140° C.) and the core component has a high-melting point (e.g. 160-170° C.). The sheath-core type corn starch fibers provides the effects identical to those of using said sheath-core type polyester fibers, and thus, forms sufficient pores in the artificial soil and also allows the soil structure to have a strong solidarity.

General polyester staple fibers, sheath-core type polyester staple fibers or OEP are used at a ratio of 0.1 to 5 parts by volume on the basis of the volume of the vegetation basis. If said volume ratio thereof is below 0.1, the fibrous materials are insufficient to form and support the framework of the basis construct, and thus, after some natural fibers are rotted upon passing 2 to 3 years, the problem may be caused in semi-permanently supporting the basis construct. On the contrary, if the ratio is in excess of 5 parts by volume, the fibers are mixed in a too much amount so that in watering frequently or in a large quantity the bed soil present on the surface, and bentonite or water absorbant polymer, which can be additionally included, may be washed out to form a wad of cotton or a non-fabric, and a rate of the artificial soil is lowered to make the vegetation basis unsuitable to the plant growth. Although there is no special problem, it may generate the environmental revulsion and thus, is unsuitable. The corn starch fiber and the sheath-core type corn starch fiber are used at the same volumetric ratio as above, for the reasons as stated above. That is, in case where the volumetric ratio is below 0.1, the fibrous materials are insufficient to form and support the framework of the basis construct, whereas at a ratio in excess of 5 parts by volume a wad of cotton or a non-fabric may be formed and the problem that it is undesirable to the plant growth may be caused.

The vegetation basis manufactured according to the present invention can additionally include bentonite or water absorbant polymer. The physical properties of bentonite include a property to absorb water by 5 times the weight with expanding the volume by about 13-16 times the original volume upon reacting with water, and an adherent property upon mixing with other materials as the active clay which is dispersed in water to improve the viscosity, gel strength and suspension degree. Further, sodium bentonite has no chemical activity, and therefore, has no influence on the original chemical properties of the materials to be adhered. In addition, by means of such properties which are not changed even under the conditions including lapse of time and high temperature bentonite can improve the disadvantages of the general bed oil for horticultural use to not absorb water upon completely drying with heat, and can allow constructing the vegetation basis which intactly maintains the supply of nutrients sufficient to the growth of plants and the physico-chemical properties, while it can also allow constructing the vegetation basis capable of rapidly absorbing water upon short raining and watering in the nature by easily and uniformly absorbing water due to the strong water absorption property of bentonite. Water absorbant polymer is used as an agent for absorbing water, and thus, can also play the same role as bentonite. The water absorbant polymer is preferably selected from the group consisting of crosslinked polyacrylic acid, crosslinked polyacrylamide, crosslinked polyvinyl alcohol, starch, mixtures of water-absorbing polymers and nutritive components such as those sold under the trade name TERRACOTTEM, and combinations thereof.

In the present invention, bentonite is used at the ratio of 0.5 to 10 parts by volume on the basis of the total volume of the vegetation basis. If bentonite is mixed in the ratio less than 0.5 parts by volume, it causes the disadvantages that a sufficient bonding strength cannot be provided to the vegetation basis and it may result in the condition resulting from use of fibrous material alone that the surface of the vegetation basis is rough and the artificial soil readily leaves from the basis, i.e. that the vegetation basis may too easily be broken or crushed so that a sever problem in molding the product itself as well as the working efficiency may be raised. In case where the amount is in excess of 10 parts by volume, the volumetric expansion is too much and the water drainage is significantly lowered thereby possibly having a bad influence on the growth of root. Water absorbant polymer is also used at the ratio of 0.5 to 10 parts by volume. When water absorbant polymer is used at the ratio greater than 10 parts by volume, it may take water even from the roots of plants to dry the plant, the water moisturizing effect thereof for a long period of time may result in rotting the roots of plants, and the volumetric expansion due to water absorption thereof may cause the destruction of a shape of the vegetation mat. If water absorbant polymer is less than 0.5 parts by volume, water cannot be uniformly distributed, the production cost is increased and its use may become insignificant.

The fibers used in the present invention are a staple fiber having a length of 2 to 20 mm. If the length of the staple fiber is less than 2 mm, it is difficult to provide with a sufficient bonding strength to the vegetation basis due to a poor formation of the network structure, whereas if the length is longer than 20 mm, the fibers are tangled with each other and thus, cannot be uniformly blended with the artificial soil, and further, after molding the solidarity thereof is too strong in so much that the growth of roots may be impeded.

The artificial soil can be generally commercially available, and usually includes cocopeat (coir), peat moss, vermiculite, zeolite, perlite, water-soluble fertilizer and antibacterial substances and wetting agents although their constituents and their compositional ratio may be somewhat different depending on the manufacturers.

Although the mixing of the components of the present invention as used together with the artificial soil can be made using various mixers known to a person skilled in the present technical field, it is desirable to mix them by means of a rotation force. Since the sheath-core type polyester staple fibers, polyester staple fibers, biodegradable fibers or OEP are present in the state that respective strands thereof are uniformly adhered to each other, it is desirable to mix them with the artificial soil while rotating in order to break up said fibers. For the above reason, it is desirable to rotate in the rate of 500 to 6,000 rpm.

When the artificial soil and the sheath-core type polyester staple fiber, polyester staple fibers, OEP, or biodegradable fibers or OEP are mixed with the hot melt adhesive and, if desired, bentonite or water absorbant polymer, and then this composition is heated, the sponge-type network structure is formed by melted hot melt adhesive, and in case where bentonite is mixed, the structure can have a stronger bonding strength due to the bonding strength of bentonite. The heating temperature is preferably in the range of 70 to 250°. If the heating temperature is lower than 70° C., the fibers of the sheath component and the hot melt adhesive cannot be melted, whereas if the heating temperature is higher than 250° C., a fire may break out due to heating of the materials. The lower limit of the heating temperature must be higher than the lower melting limit of the hot melt adhesive as used and the lower melting limit of the sheath component of the sheath-core type fibers. The upper limit must be less than the upper melting limit of the core component.

Although the heating can be made using various methods known to a person skilled in the present technical field, the heating by means of a high frequency drier using microwave is preferable. When heating with the microwave, the desired temperature can be attained within a short period of time, the heat is smoothly transferred to the mixed composition within a short period of time to uniformly form the sponge-type network structure having a strong bonding strength throughout the composition while melting the fibers of the sheath component and the hot melt adhesive and drying bentonite. In the present invention, it is desirable to use the microwave for 10 to 600 seconds. If the time of using the microwave is less than 10 seconds, a sufficient heat cannot be provided, whereas if the time is in excess of 600 seconds, the hourly throughput may be lowered to increase the production unit cost. Heating may be provided in the form of steam and various forms of energy. Heating with steam as above is an improve method capable of uniformly transferring heat to various forms of the three-dimensional constructs. The pressurization is preferably made using the steam pressure of 2 to 7 $kg/cm^2$. If the pressure is less than 2 $kg/cm^2$, the heat is not sufficiently transferred to the mixed composition, whereas if the pressure is greater than 7 $kg/cm^2$, pores suitable to the growth of plants may be disappeared by such pressure to cause the impediment of plant growth.

Microwave is a kind of electromagnetic waves, and denotes an electromagnetic wave having a very short wavelength. It names generically an electric wave having the frequency of about 1,000 MHz (megahertz) to 30 GHz (gigahertz, 1 gigahertz), and the wavelength of about 1-30 cm. Among them, except for those used for communication, the frequencies conventionally used in the general field of industry are 915 MHz and 2.45 GHz, which frequency are used in the high frequency driers conventionally used in home.

In molding the mixed composition, the molding step and the heating step can be simultaneously conducted, that is, the molding is carried out by heating the composition in the mold having a certain shape under pressure. The vegetation basis of the present invention can be well processable and therefore, the shape and size of the basis to be molded can be diversely manufactured by changing the mold. Therefore, the vegetation basis can be molded in the form of the mat having a grid pattern, and further, vary various forms of the vegetation basis can be manufactured depending on the shapes of molds including block forms or the shapes of animals. In addition, the planting can be easily and conveniently conducted by pre-forming the planting holes in molding the vegetation basis.

The process for manufacturing the vegetation basis according to the present invention comprises the step of preparing the artificial soil, the sheath-core type polyester staple fibers, polyester staple fibers, OEP or biodegradable fibers, and the hot melt adhesive, and if desired, bentonite or water absorbant polymer; the step of mixing said components; the step of loading the resulting mixture of said components into the mold; the step of applying the pressure to the said loaded mixture; the step of molding said loaded mixture with heating; and the step of drying the molded mixture.

In loading the mixture into the mold, the mixed materials can be discharged in a certain quantity from a metering device and loaded into the mold having planting holes (holes for planting the plants to the vegetation basis) to form the vegetation basis having the planting holes. Simultaneously with the completion of molding, the vegetation basis is completely produced. This process produces the double effect to generate no pollutional material and further to completely eradicate sundry microbes and harmful insects with high steam temperature.

EXAMPLES

The present invention will be specifically illustrated by the following examples. The examples are intended to illustrate the invention but are not construed to limit the scope of the present invention.

Example 1

Figure 2A:
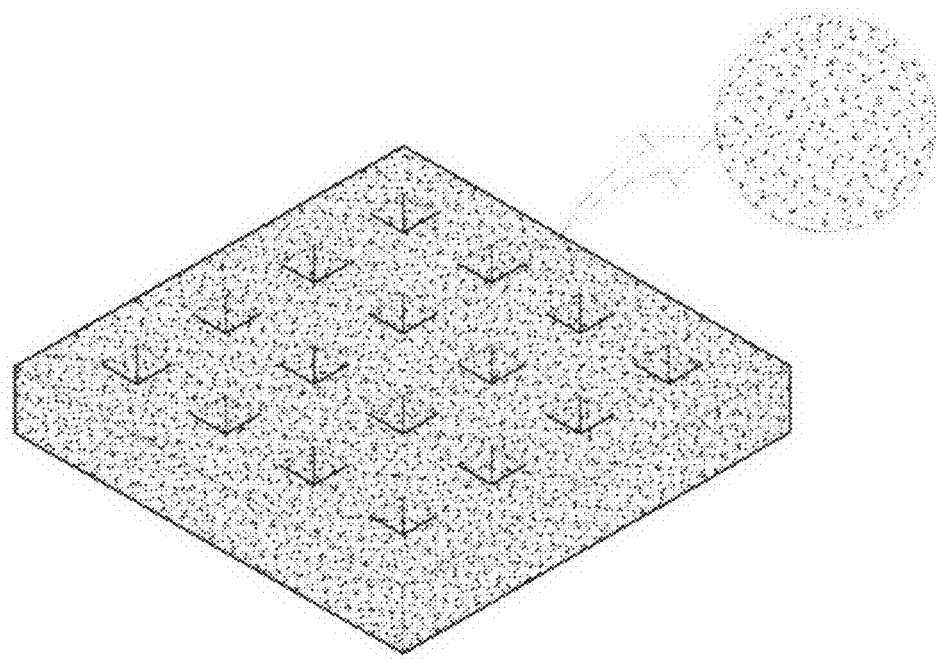
FIG. 2a is a diagram showing one embodiment of the sponge-type vegetation basis of the present invention as molded in the form of a mat having planting holes.
Figure 2B:
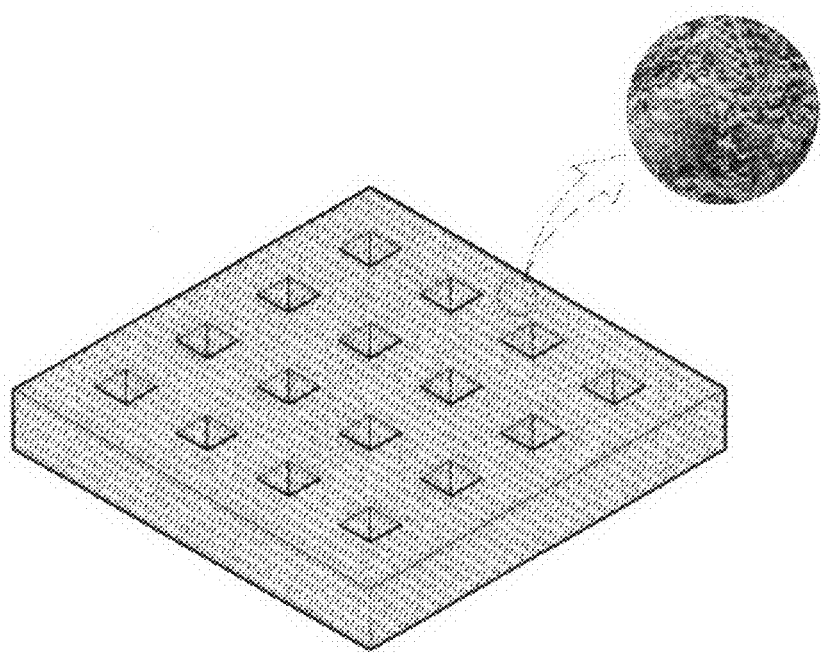
FIG. 2b is a diagram showing an embodiment of the sponge-type molding of the vegetation basis of the present invention having the crumbled structure made from the fibrous material, bentonite, the artificial soil and the hot melt adhesive.

Production of the Vegetation Basis Comprising the Sheath-Core Type Polyester Staple Fiber The artificial soil was Baroker® bed soil sold by Seoul Bio Co., Ltd., with using in an amount of 100 parts by weight. The sheath-core type polyester fiber (Ezbon-L®, Saehan Industries Inc., Korea) was used in an amount of 20 parts by weight with cutting to 6 mm. They were introduced into the rotational mixer and then mixed together with 3,000 rpm. It was confirmed that the mutually twisted, sheath-core type polyester staple fibers were disentangled and well accomplished the blending with the artificial soil. The mixed composition was loaded into the mold having a grid pattern and then introduced into the high frequency drier (ANYHYDRO®, Jeenyang Platech Co., Ltd., Korea) and heated to 170° C. for 200 seconds under pressure of 4 kg/cm² to produce the vegetation mat comprising the sheath-core type polyester staple fiber in a grid pattern (FIGS. 2a, 2b). The frequency as used as 2.45 GHz. It could be confirmed that the soil in the vegetation mat as produced formed the crumbled structure (FIG. 1).

Example 2

Figure 3A:
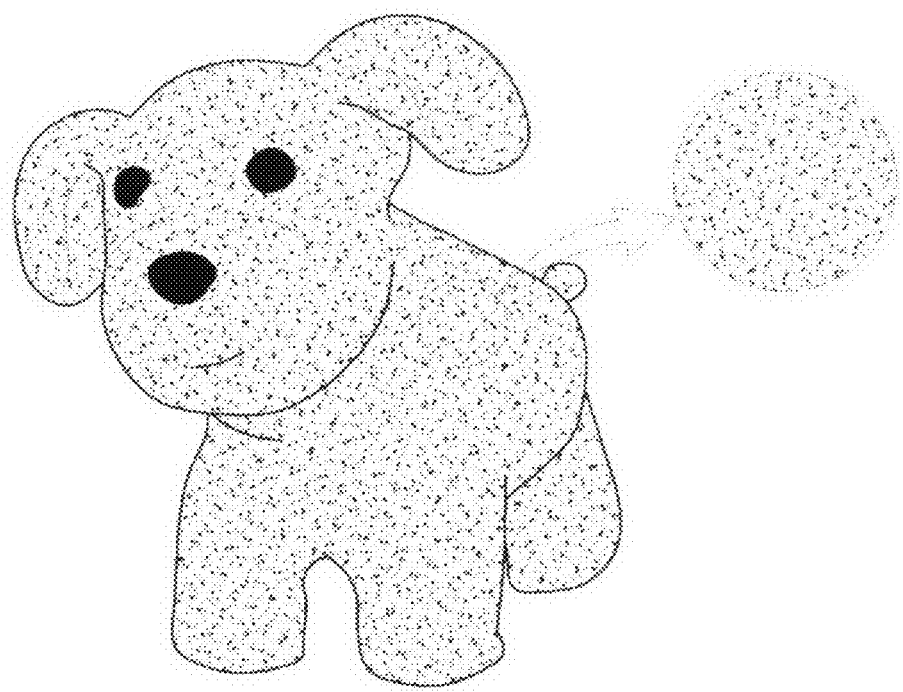
FIG. 3a is a diagram showing an embodiment of the vegetation basis of the present invention as molded using the biodegradable fiber for bank protection.
Figure 3B:
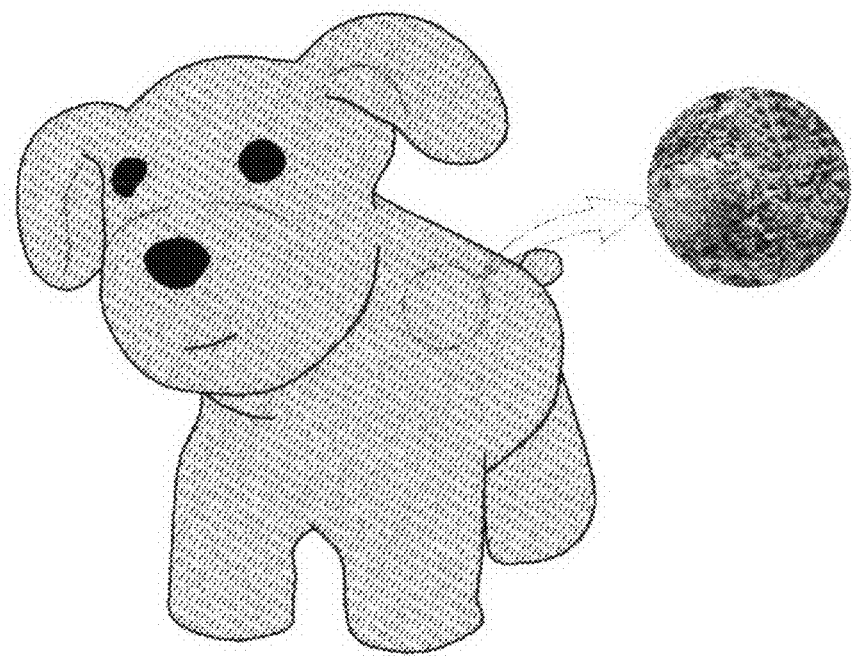
FIG. 3b is a diagram showing an embodiment of the sponge-type molding of the vegetation basis of the present invention made from the biodegradable fibrous material, the artificial soil and the hot melt adhesive.

Production of the Vegetation Basis Comprising the Sheath-Core Type Polyester Staple Fiber and the Hot Melt Adhesive The vegetation mat having a shape of animal was prepared identically to Example 1 except that the polyurethane resin (UNEX4073, DAKOTA, Belgium) as the hot melt adhesive was additionally included in an amount of 5 parts by weight (FIGS. 3a, 3b). It could be confirmed that the soil in the vegetation mat as produced formed the crumbled structure (FIG. 1).

Example 3

Production of the Vegetation Basis Comprising the Polyester Staple Fiber

Figure 4:
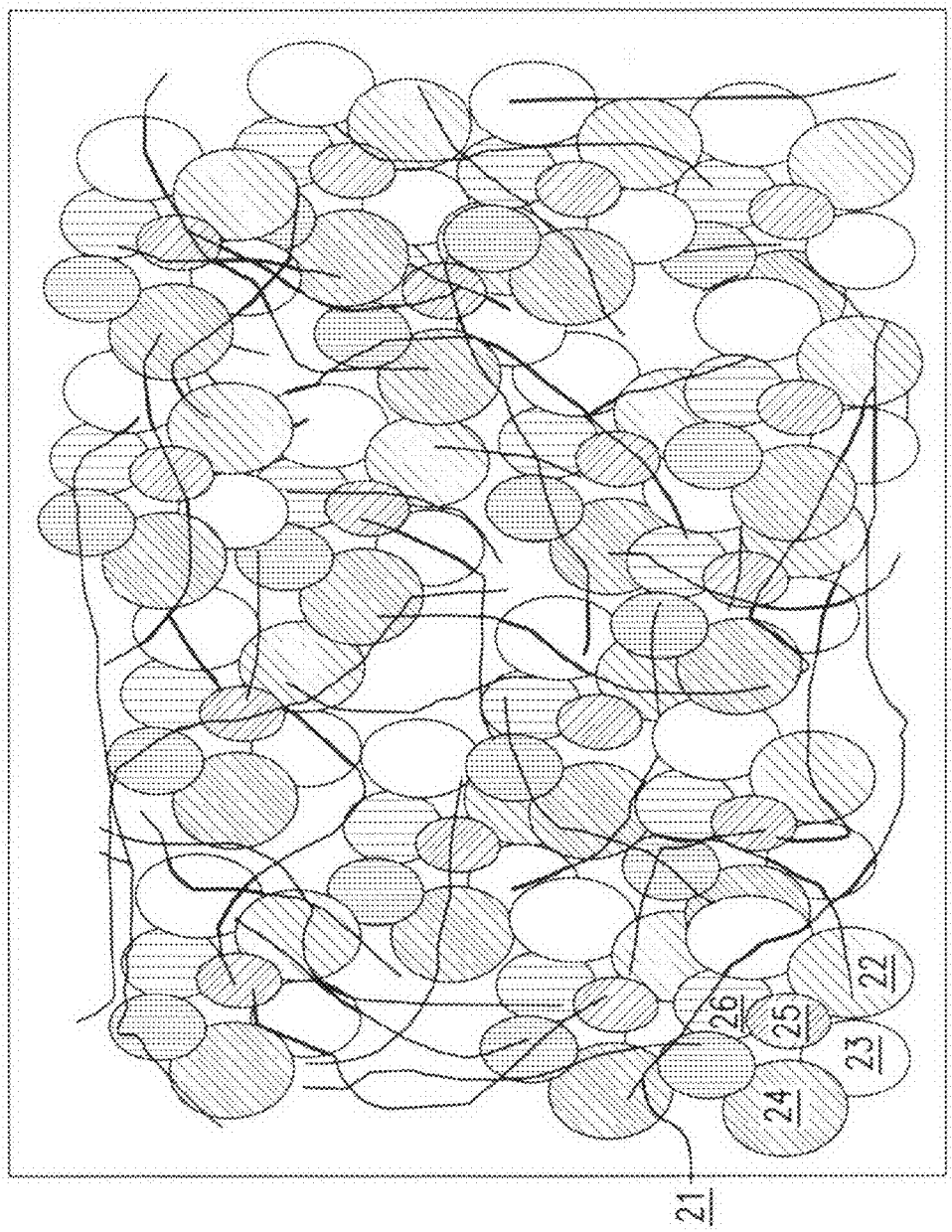
FIG. 4 is a diagram showing the crumbled structure of the vegetation basis produced according to the present invention.

The artificial soil was Baroker® bed soil sold by Seoul Bio Co., Ltd., with using in an amount of 95 parts by volume. The polyester fiber was used in an amount of 3 parts by volume with cutting to 10 mm. As the hot melt adhesive, the polyurethane resin having melting point of 130° C. (UNEX4073, DAKOTA, Belgium) as purchased from the market was used in an amount of 2 parts by volume. They were introduced into the rotational mixer and then mixed together with 4,000 rpm. It was confirmed that the mutually twisted, sheath-core type polyester fibers were disentangled and well accomplished the blending with the artificial soil. The mixed composition was loaded into the mold having a grid pattern and then introduced into the high frequency drier (ANYHYDRO®, Jeenyang Platech Co., Ltd., Korea) and heated to 170° C. for 200 seconds under pressure of 5 kg/cm² to produce the vegetation mat comprising the polyester staple fiber in a grid pattern (FIGS. 2a, 2b). The frequency as used as 2.45 GHz. It could be confirmed that the soil in the vegetation mat as produced formed the crumbled structure (FIGS. 1 and 4). However, bentonite was excluded in FIG. 4.

Example 4

Production of the Vegetation Basis Comprising Corn Starch Fiber

Under the same conditions as in Example 3, except that the corn starch fiber having melting point of 165° C. (Ingeo®, Cargill Inc., USA) was used instead of the sheath-core type polyester fiber used in Example 3, the vegetation mat having a grid pattern was produced. It could be confirmed that the soil in the vegetation mat as produced formed the crumbled structure (FIGS. 1 and 4). However, bentonite was excluded in FIG. 1.

Example 5

Production of the Vegetation Basis Having Planting Holes

While maintaining the other conditions of Example 1, the mixture discharged from a metering device was loaded into the mold having planting holes to produce the vegetation basis having planting holes (FIGS. 2a, 2b).

Example 6

Production of the Vegetation Basis Comprising Bentonite

The vegetation basis having a grid pattern was produced identically to Example 1, except that in Example 3 the bed soil was used in an amount of 93 parts by volume, the sheath-core type corn starch fiber was used in amount of 2 parts by volume with cutting to 10 mm, bentonite (Volclay Super Gel®, Volclay Korea, Korea) was used in an amount of 2.5 parts by volume, and the hot melt adhesive was used in an amount of 2.5 parts by volume. It could be confirmed that the soil in the vegetation mat as produced formed the crumbled structure (FIG. 4).

Example 7

Production of the Vegetation Basis Comprising Water Absorbant Polymer

Under the same conditions as in Example 5, except that TERRACOTTEM (trade name for a mixture of water-absorbing polymers and nutritive components sold by Terra Green Co., Ltd., Korea) was used in an amount of 2.5 parts by volume instead of bentonite, the vegetation mat having a grid pattern was produced. It could be confirmed that the soil in the vegetation mat as produced formed the crumbled structure (FIG. 4). However, bentonite in FIG. 4 means terra cottem.

What is claimed is:

1. A vegetation basis comprising 100 parts by weight of an artificial soil and 4 to 30 parts by weight of a sheath-core type polyester staple fiber having a sheath component and a core component, wherein said sheath component has a melting point of from 70° C. to 150° C., and said core component has a melting point of at least 270° C., and wherein a hot melt adhesive is additionally included in the vegetation basis in an amount of 0.2 to 8 parts by weight, said hot melt adhesive being a polyurethane resin.

2. The vegetation basis of claim 1 wherein said hot melt adhesive has a melting point of from 70° C. to about 200° C.

3. The vegetation basis of claim 2 wherein said hot melt adhesive is in the form of a fine powder.

4. A process for producing the vegetation basis of claim 1 comprising the step of preparing an artificial soil, a polyurethane hot melt adhesive, and a sheath-core type polyester staple fiber; the step of mixing said artificial soil, said polyurethane hot melt adhesive, and said sheath-core type polyester staple fiber to provide a mixture; the step of loading the mixture into a mold; the step of applying a pressure to the loaded mixture; the step of molding said loaded mixture with heating; and the step of drying the molded mixture.

5. The process for producing the vegetation basis according to claim 4, characterized in that said mold has a planting hole.

* * * * *